United States Patent
Albasheir et al.

(10) Patent No.: US 11,190,551 B2
(45) Date of Patent: Nov. 30, 2021

(54) INTERCEPTION OF HIGH-THROUGHPUT DATA TRAFFIC

(71) Applicant: T-Mobile USA, Inc., Bellevue, WA (US)

(72) Inventors: Suliman Albasheir, Issaquah, WA (US); Rahul Pal, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 95 days.

(21) Appl. No.: 16/563,688

(22) Filed: Sep. 6, 2019

(65) Prior Publication Data

US 2021/0076260 A1 Mar. 11, 2021

(51) Int. Cl.
*H04W 80/10* (2009.01)
*H04W 80/06* (2009.01)
*H04W 76/25* (2018.01)
*H04W 28/10* (2009.01)
*H04L 29/06* (2006.01)
*H04W 12/80* (2021.01)

(52) U.S. Cl.
CPC ............ *H04L 63/30* (2013.01); *H04W 12/80* (2021.01); *H04W 28/10* (2013.01); *H04W 76/25* (2018.02); *H04W 80/06* (2013.01); *H04W 80/10* (2013.01)

(58) Field of Classification Search
CPC ..... H04W 63/30; H04W 12/80; H04W 28/10; H04W 80/10; H04W 80/06; H04W 76/25
See application file for complete search history.

(56) References Cited

U.S. PATENT DOCUMENTS

2018/0205763 A1* 7/2018 Seetharaman .......... H04L 63/30
2020/0229035 A1* 7/2020 Kim ..................... H04L 47/2483

FOREIGN PATENT DOCUMENTS

WO  WO-2019147435 A1 * 8/2019 ............ H04W 12/80

OTHER PUBLICATIONS

3GPP TS 33.127 v15.2.0 (Jun. 2019), Technical Specification, 3rd Generation Partnership Project; Technical Specification Group Services and System Aspects; Security; Lawful Interception (LI) architecture and functions (Release 15) (Year: 2019).*
3GPP TS 33.128 V15.1.0 (Jun. 2019), Technical Specification, 3rd Generation Partnership Project; Technical Specification Group Services and System Aspects; Security; Protocol and procedures for Lawful Interception (LI); Stage 3 (Release 15) (Year: 2019).*
ETSI TS 103 221-2 V1.1.1 (Mar. 2019), Technical Specification, Lawful Interception (LI); Part 2: Internal Network Interface X2/X3 for Lawful Interception (Year: 2019).*

* cited by examiner

*Primary Examiner* — Moo Jeong
(74) *Attorney, Agent, or Firm* — Lee & Hayes, P.C.

(57) ABSTRACT

Systems, devices, and techniques described herein relate to interception of data traffic that is traversing a network at a relatively high throughput rate. In some examples, a request to initiate interception is received from a server. In response to receiving the request to initiate interception, an instruction to forward user plane data to the server can be transmitted to a User Plane Function (UPF). The UPF may be transferring the user plane data in a data flow. The instruction may cause the UPF to forward the user plane data to the server in multiple streams. In addition, control plane data associated with the data flow can be transmitted to the server.

14 Claims, 6 Drawing Sheets

INTERCEPTION OF HIGH-THROUGHPUT DATA TRAFFIC

BACKGROUND

Modern terrestrial telecommunication systems include heterogeneous mixtures of 2nd, 3rd, and 4th Generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include 5th Generation (5G) cellular-wireless access technologies, among other forthcoming technologies, to provide improved bandwidth and decreased response times to a multitude of devices that may be connected to a network.

BRIEF DESCRIPTION OF THE DRAWINGS

The detailed description is set forth with reference to the accompanying figures. The use of the same reference numbers in different figures indicates similar or identical items or features.

DETAILED DESCRIPTION

The systems, devices, and techniques described herein relate to interception of high-throughput data traffic. In particular implementations, interception of high-throughput data traffic can be enabled by forwarding user plane data to a server via multiple data streams.

Lawful Interception (LI) can refer to a process by which law enforcement agencies and other legally authorized entities can selectively intercept and evaluate data transferred through a telecommunications network. Wiretapping is one example of LI. Certain LI processes involve a network forwarding, to a server, at least one of user plane data traffic, control plane data, or network management data.

In some examples, a law enforcement agency may have reason to believe that a particular subscriber of the telecommunications network has committed a crime. The law enforcement agency may obtain a court order authorizing lawful interception from a court, judge, or some other judicial entity. Upon presenting the court order to an administrator of the telecommunications network, various components of the network may be configured to automatically forward various types of data associated with the particular subscriber to a device (e.g., a server, a storage device, or the like) accessible by the law enforcement agency. The device may store the forwarded data, for later analysis by the law enforcement agency.

In example 4th Generation (4G) Long Term Evolution (LTE) networks, user plane data is exchanged between a User Equipment (UE) and a Data Network (DN) via a Packet Data Network (PDN) Gateway (PGW). The PGW can forward the user plane data to a device managed by an applicable law enforcement agency. Due to the throughput limits of LTE networks (e.g., up to 1 gigabyte per second according to standards or up to 100 megabytes per second in some real-world systems), the PGW can forward the user plane data in a single stream and in real time as the PGW is also transferring the user plane data between the UE and the DN.

However, 5th Generation (5G) networks enable significantly higher throughput than 4G LTE networks. For instance, a 5G network may be configured to have a throughput of up to 10 Gigabytes (GB) per second. Accordingly, it may be impossible for a component of the 5G network transferring user plane data between a UE and a DN to forward the user plane data in real time via a single data stream.

Because the throughput of a 5G network can exceed the maximum data transfer rate of a single data stream used to perform lawful interception, a component of the 5G network may have to temporarily hold (e.g., store or buffer) the user plane data being transferred through the network in order to forward the user plane data in the single data stream. However, the component may have limited buffer capacity. When the buffer is at capacity and the transfer rate at which the user plane data is transmitted between the UE and the DN exceeds the rate at which the user plane data is forwarded to a lawful interception entity, user plane data can be lost.

Various implementations of the present disclosure enable real-time interception of user plane data that is being transferred through high-throughput networks, such as 5G networks. In particular implementations, a User Plane Function (UPF) may transmit user plane data to an interception server via multiple, parallel data streams. For instance, the UPF may establish multiple Transfer Control Protocol (TCP) streams by which to forward user plane data to the interception server. Even when a data transfer rate of the user plane data through the UPF exceeds the maximum data transfer rate of a single TCP stream, the UPF can nevertheless transfer the user plane data to the interception server in real time via the multiple data streams.

In particular implementations, interception can be initiated when a Session Management Function (SMF) receives a request for interception from the interception server. The SMF may instruct the applicable UPF to forward the user plane data to the interception server in response to the request.

When the user plane data is split into multiple data streams, the interception server may utilize a key to restore the user plane data from the multiple data streams. In particular implementations, the SMF may provide the key to the interception server. The key may be provided to the SMF by the UPF that split the user plane data into the multiple data streams. In certain cases, the SMF may instruct the UPF how to split up the user plane data into the multiple data streams. In some cases, the SMF may provide the key to the interception server independently of the UPF.

Further, the SMF may handle various control plane data corresponding to the user plane data transferred through the UPF. In some cases, in response to receiving the request for interception from the interception server, the SMF may transmit the control plane data to the interception server via one or more data streams. Accordingly, the interception server may track various signaling-related features of the UE and/or the DN, such as the location of a base station to which the UE is attached, subscriber information, call histories, and the like.

Various implementations provide improvements to the field of telecommunication networks. In examples in which a UPF transmits user plane data in multiple data streams to an interception server, the user plane data can be transmitted to the interception server in real time. A collective data transfer rate of the multiple data streams can keep up with high data throughput levels, such as those of high-throughput 5G networks. Furthermore, because the user plane data can be transferred in real time, loss of the user plane data can be prevented.

Particular applications can be applied to specific components in real-world telecommunication networks. For instance, various functionality disclosed herein can be implemented by at least one of an interception server, an SMF, or a UPF.

Particular implementations of the present disclosure will now be described with reference to the accompanying figures.

Figure 1:
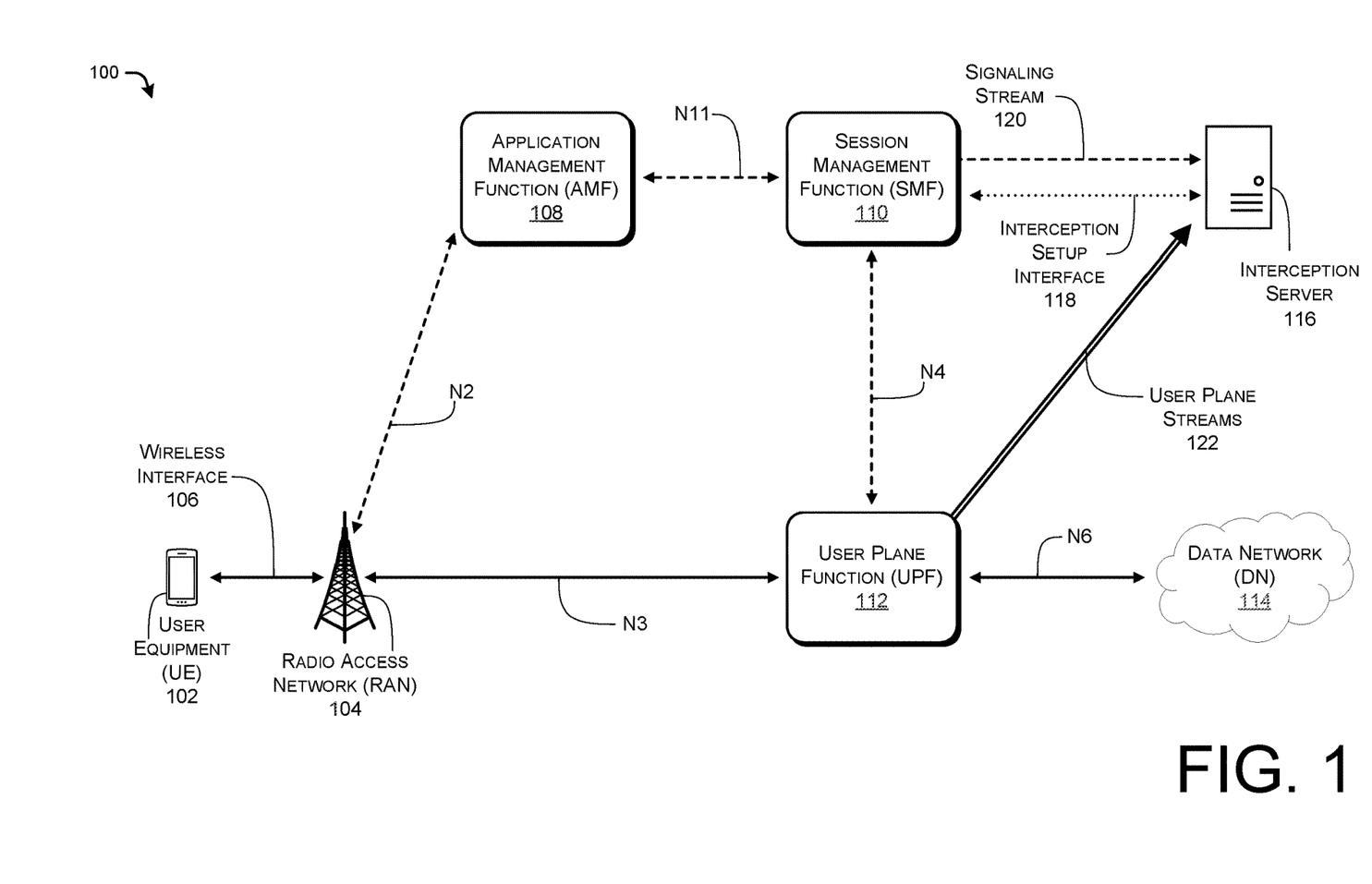
FIG. 1 illustrates an example environment for performing interception in a high-throughput network.

FIG. 1 illustrates an example environment 100 for performing interception in a high-throughput network. For instance, the environment 100 may apply to a standalone or non-standalone 5th Generation (5G) network, in some cases.

A User Equipment (UE) 102 may connect to a Radio Access Network (RAN) 104 via a wireless interface 106. As used herein, the terms "UE," "user device," "wireless communication device," "wireless device," "communication device," "mobile device," and "client device," can be used interchangeably to describe any UE (e.g., the UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future Internet Protocol (IP)-based network technology or evolution of an existing IP-based network technology.

In general, the UE 102 can be implemented as any suitable type of computing device configured to communicate over a wired or wireless network, including, without limitation, a mobile phone (e.g., a smart phone), a tablet computer, a laptop computer, a Portable Digital Assistant (PDA), a wearable computer (e.g., electronic/smart glasses, a smart watch, fitness trackers, etc.), an Internet-of-Things (IoT) device, an in-vehicle (e.g., in-car) computer, and/or any similar mobile device, as well as situated computing devices including, without limitation, a television (smart television), a Set-Top-Box (STB), a desktop computer, an IoT device, and the like.

The wireless interface 106 may include multiple channels, such as at least one uplink channel and at least one downlink channel. The UE 102 may transmit uplink data to the radio network 104 and receive downlink data from the radio network 104 via the radio interface 106. In some cases, the radio interface 106 may utilize one or more millimeter-wave wireless channels.

The radio network 104 may be a Radio Access Network (RAN). In this manner, the radio network 104 can include and/or be substituted for a 3GPP RAN, such a GSM/EDGE RAN (GERAN), a Universal Terrestrial RAN (UTRAN), or an Evolved UTRAN (E-UTRAN), or alternatively, via a "non-3GPP" RAN, such as a Wi-Fi RAN, or another type of wireless local area network (WLAN) that is based on the IEEE 802.11 standards. In some instances, the radio network 104 can include a Wi-Fi Access Point (AP). Although not illustrated, the environment 100 can further include any number and type of base stations representing any number and type of macrocells, microcells, picocells, or femtocells, for example, with any type or amount of overlapping coverage or mutually exclusive coverage compared to the radio network 104. In some cases, the UE 102 may connect to the RAN 104 via an attachment procedure.

In a registration procedure, the UE 102 may transmit a message requesting registration to the RAN 104 via the wireless interface 106. In some cases, the message may be a Non-Access Stratum (NAS) message, that can be forwarded by the RAN 104 without the RAN 104 parsing or processing the message. The RAN 104 may select an Application Management Function (AMF) 108 and forward the message from the RAN 102 to the AMF 108 via an N2 interface. The RAN 104 may also forward other information to the AMF 108, such as a location of the UE 102, an identifier of the UE 102 and/or the RAN 104, or the like. In general, the AMF can be implemented as a network function including functionality to provide UE-based authentication, authorization, mobility management, etc., to various UEs, such as the UE 102. In some instances, the AMF can include functionality to terminate a RAN control plane interface between the UE 102 and other functions of the network. In some instances, the AMF can include functionality to perform registration management of the UE 102 in the network, connection management, reachability management, mobility management, access authentication, access authorization, security anchor functionality (e.g., receiving and/or transmitting security keys during registration/authorization), and the like.

In some cases, the AMF 108 may gather various information about the UE 102 and/or the session from other components in the network. For instance, the AMF 108 may communicate with an Authentication Server Function (AUSF), which can obtain authentication information about the UE 102 from a UDM. The UDM may further provide subscriber data management information to the AMF 108. The AMF 108 may further create a policy-association with a Policy Control Function (PCF). The PCF may register with the AMF 108, so that it can be notified of various events associated with the UE 102 (e.g., location change, communication failure, etc.).

The AMF 108 may communicate with a Session Management Function (SMF) 110 over an N11 interface. In general, the SMF can be implemented as a network function including functionality to manage communication sessions by and between UEs, and/or to provide Internet Protocol (IP) addresses to the UEs.

The AMF 108 may update the SMF 110 about a context associated with the UE 102. The SMF 110 may assign an identifier for the UE 102 and/or a communication tunnel used to deliver user plane data to and from the UE 102. For instance, the SMF 110 may assign an IP address to the UE 102.

The SMF 110 may select a User Plane Function (UPF) 112 to facilitate the transmission of user plane data between the UE 102 and a Data Network (DN) 114. In general, the UPF 112 can be implemented as a network function including functionality to control data transfer between the UE 102 and the various components of the environment 100. In some instances, the UPF 112 can include functionality to act as an anchor point for Radio Access Technology (RAT) handover (e.g., inter and intra), external Protocol Data Unit (PDU) session point of interconnect to an external network (e.g., the Internet), packet routing and forwarding, packet inspection and user plane portion of policy rule enforcement, traffic usage reporting, traffic routing, Quality of Service (QoS) handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, the UPF 112 may be one or more UPFs, which are associated with the UE 102.

In general, the DN 214 can include any public or private network(s), such as any of the Internet, an Internet Protocol (IP) Media Subsystem (IMS) network, and the like. In addition, the DN 214 may include one or more devices that can receive and transmit data. For example, the DN 214 may include any of media server(s), content server(s), user device (s), and the like.

The SMF 110 may communicate with the UPF 112 over an N4 interface. In some examples, the SMF 110 may exchange Packet Forwarding Control Protocol (PFCP) messages with the UPF 112 to set up a communication session for the UE 102. For instance, the SMF 110 may transmit a PFCP Session Modification Request to the UPF 112, which enables the UPF 112 to receive uplink data from the RAN 104 over an N3 interface and to forward the uplink data to the DN 114 over an N6 interface. The UPF 112 may be further prepared to receive downlink data from the DN 114 over the N6 interface and to forward the downlink data to the RAN 104 over the N3 interface, for delivery to the UE 102. The downlink data and the uplink data transmitted through the UPF 112 may include user plane data.

As used herein, the term "user plane data" can refer to any uplink or data carrying substantive services that are received and/or transmitted by a UE. The user plane data can include data transmitted between a UE (e.g., the UE 102) and a DN (e.g., the DN 114) via a UPF (e.g., the UPF 112), in particular implementations. User plane data can be delivered in the form of one or more data packets. In some cases, user plane data can include at least one of image data, video data, voice data, web browsing data, audio data, or the like.

In contrast, the term "control plane data" can refer to any uplink or downlink data carrying information related to controlling the flow of user plane data through at least one delivery network, such as the environment 100. The control plane data can enable the delivery of services through the environment 100 but may not include the services themselves. In some examples, control plane data can include signaling data exchanged by various components of the environment 100 (e.g., the AMF 108, the SMF 110, and/or the UPF 112) to establish a user plane data flow through the network by which the services are provided, to control the user plane data flow, and to end the user plane data flow. In particular implementations, the control plane data can include NAS data exchanged between various components of the environment 100. Control plane data can include, for example, information about a RAN (e.g., the RAN 104) to which a UE (e.g., the UE 102) attaches, subscriber information associated with the UE, a 5G QoS Indicator (5QI) corresponding to requested services through the network, or the like.

The RAN 104 and the UPF 112 may be configured to transfer the user plane data between the UE 102 and the DN 114 at a relatively high throughput rate. For example, the throughput rate can be at least one of 10 Megabytes (MB) per second, 100 MB per second, 1 Gigabyte (GB) per second, 10 GB per second, or higher. In particular implementations, the throughput rate is about 10 GB per second. Accordingly, in some implementations, the environment 100 can support the delivery of at least one of Enhanced Mobile Broadband (eMBB), Ultra Reliable Low Latency Communications (URLLC), or Massive Machine Type Communications (mMTC). For instance, the user plane data exchanged between the UE 102 and the DN 114 may correspond at least one of eMBB, URLLC, or mMTC services.

An interception server 116 may be configured to request interception of the user plane data exchanged between the DN 114. In some cases, a legal entity (e.g., a law enforcement agency) may be permitted to intercept the user plane data according to local laws and regulations. For example, the legal entity may identify a user of the UE 102, and may use the interception server 116 to request interception of data traffic associated with the user.

The interception server 116 may transmit a request for interception to the SMF 110 over an interception setup interface 118. In some cases, the request may specify an identifier of the UE 102, an identifier of a user of the UE 102, a subscriber account associated with the user and/or the UE 102, an identifier of a device communicating with the UE 102 over the DN 114, or the like. The SMF 110 may identify the UE 102 and/or the applicable communication session based on the request from the interception server 116. In some instances, the SMF 110 may identify the UE 102 by communicating with the AMF 108 and/or other components of the network based on some identifier of the UE 102 in the request received from the interception server 116.

The request may also include an indicator that the interception server 116 is authorized to perform interception. For example, the interception server 116 and the SMF 110 may exchange messages as part of an authentication procedure prior to initiating interception. For instance, the interception server 116 can be verified at a time of integration. According to particular implementations, the interception server 116 and the SMF 110 may perform a handshake procedure in which information verifying the authority of the interception server 116 can be exchanged. The authentication procedure may prevent unauthorized entities (e.g., foreign spy agencies, black-hat hackers, etc.) from intercepting the user plane data.

According to particular examples, the request may indicate one or more limits. For instance, the request may be for user plane data exchanged during a particular time (e.g., between the hours of 9:00 PM and 11:00 PM on a specified day), user plane data corresponding to a particular type of services (e.g., voice services), or the like. The one or more limits may ensure that interception request is tailored to the authorization of the legal entity requesting interception. For example, the one or more limits may ensure that the interception server 116 receives data that is specific to the limits of a particular warrant, court order, or the like, that authorizes the interception.

In response to receiving the request for interception from the interception server 116, the SMF 110 may transmit control plane data associated with the communication session to the interception server 116 via at least one signaling stream 120. In some cases, the signaling stream 120 can include a Transfer Control Protocol (TCP) stream.

In further response to receiving the request for interception from the interception server 116, the SMF 110 may transmit a message to the UPF 112. The message may instruct the UPF 112 to forward user plane data to the interception server 116, in accordance with the request from the interception server 116. In some cases, the message may specify the UE 102 and/or the communication session over which the requested user plane data is exchanged. In some cases, the message may indicate one or more additional features (e.g., the one or more limits) to the request. For instance, the message may indicate a particular time interval associated with the requested user plane data.

In response to receiving the message from the SMF 110, the UPF 112 may forward the user plane data in multiple user plane streams 122. In some cases, the message itself may instruct the UPF 112 to forward the user plane data in multiple user plane streams 122. For instance, the message may instruct the UPF 112 how the user plane data should be split up between the multiple user plane streams 112. In certain implementations, the UPF 112 may be pre-programmed to split up the user plane data in a particular way upon receiving the message from the SMF 110. The multiple user plane streams 122 may be limited according to the one or more limits to the request, to ensure that the interception server 116 only receives the user plane data specified by the request. For example, if the request is limited to user plane data associated with a particular time interval, then only user plane data within the particular time interval is forwarded to the interception server 116 in the multiple user plane streams 122.

According to particular implementations, the throughput rate of the user plane data through the UPF 112 may exceed a maximum data transfer rate of one of the streams among the multiple user plane streams 122. As used herein, the term "throughput rate" can refer to a rate at which data is transmitted through at least one node, interface, or network between two terminal nodes. As used herein, the term "maximum data transfer rate" can refer to a maximum rate at which data can be transmitted through at least one node, interface, or network according to a particular transmission protocol. The multiple user plane streams 122 may include multiple TCP streams, in certain examples. However, the collective throughput of the multiple user plane streams 122 can accommodate the throughput rate of the user plane data through the UPF 112. Accordingly, the multiple user plane streams 122 can enable the UPF 112 to forward the user plane data at the same or similar rate as the user plane data is transferred through the UPF 112 between the UE 102 and the DN 114.

Upon receiving the multiple user plane streams 122 from the UPF 112, the interception server 116 may reconstruct the user plane data based on a key. In some cases, the SMF 110 may transmit the key to the interception server 116, e.g., over the interception setup interface 118. In some circumstances, the UPF 112 may split the user plane data into the multiple user plane streams 122 according to a predefined scheme. The key may be prestored at the UPF 112 and/or the SMF 110. In some cases, the UPF 112 splits the user plane data into the multiple user plane streams 122 based on one or more current network conditions (e.g., the current throughput rate of the user plane data through the UPF 112, a current buffering capability of the UPF 112, or the like). The key may be forwarded by the SMF 110 from the UPF 112 to the interception server 116, in some cases.

In various implementations, the interception server 116 may store the control plane data and/or the user plane data in a local database. The law enforcement agency may independently analyze the control plane data and the user plane data after the control plane data and the user plane data has been forwarded to the interception server 116.

Accordingly, the environment 100 can enable efficient interception of signaling and/or user plane data. The user plane data can be received by the interception server 116 in real-time, even when the user plane data is being transmitted between the UE 102 and the DN 114 at a relatively high throughput rate. Furthermore, even when there is a split between entities handling the control plane data and the user plane data, the interception server 116 can efficiently receive both the control plane data and the user plane data.

Figure 2A:
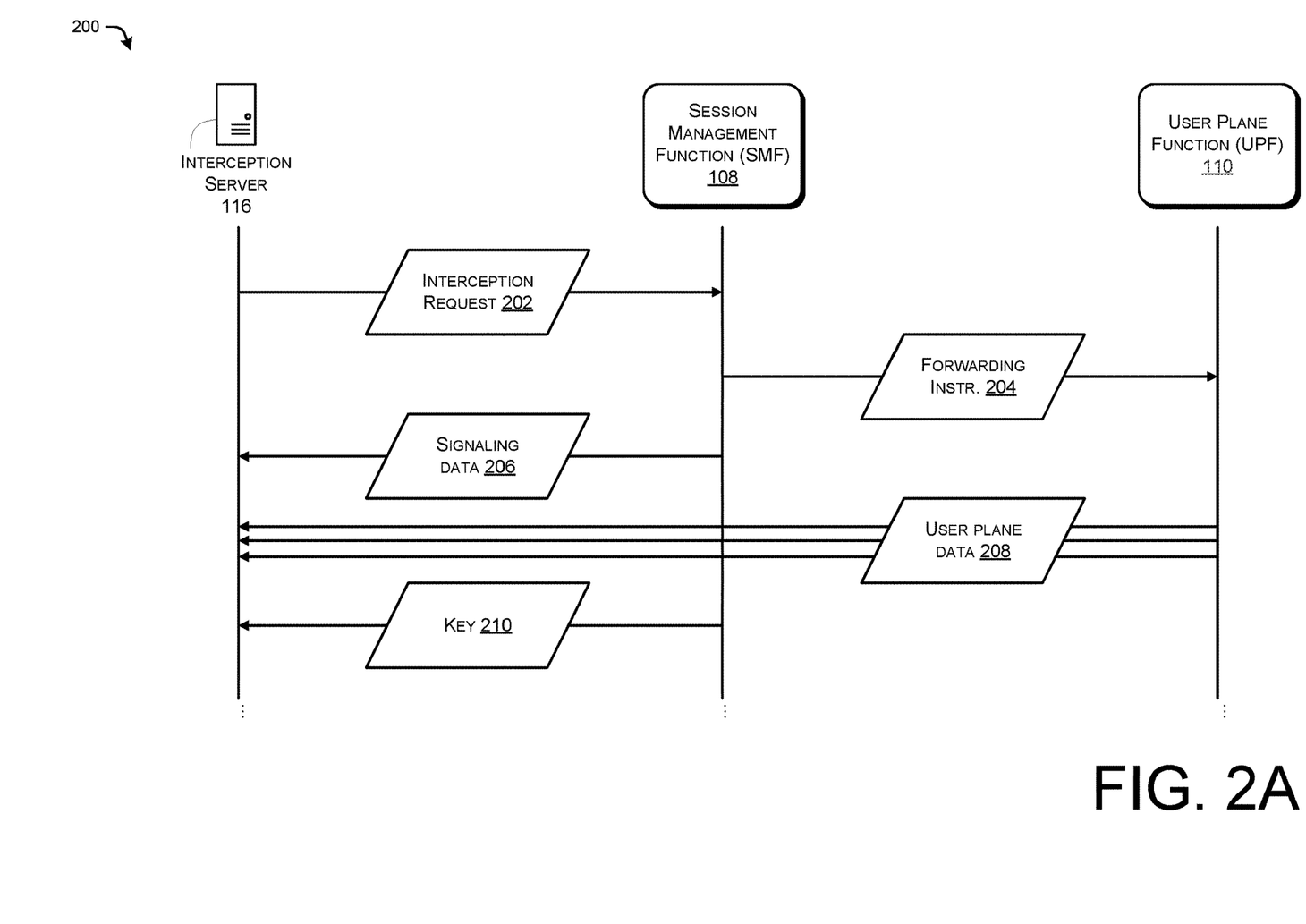
FIGS. 2A and 2B illustrate example signaling for performing interception of high-throughput data.

FIG. 2A illustrates example signaling 200 for performing interception of high-throughput data. In various implementations, the signaling 200 can occur between the interception server 116, the Session Management Function (SMF) 108, and the User Plane Function (UPF) 110 described above with reference to FIG. 1.

In particular implementations, the signaling 200 can occur after a communication session has been set up between a User Equipment (UE) (e.g., the UE 102 described above with reference to FIG. 1) and a Data Network (DN) (e.g., the DN 114 described above with reference to FIG. 1). For example, the UE may be attached to a Radio Access Network (RAN), the SMF 108 may have selected the UPF 110, and/or the UPF 110 may be transferring uplink and downlink user plane data between the UE 102 and the DN.

The interception server 116 may transmit an interception request 202 to the SMF 108. The interception request 202 may identify the UE, the communication session, or otherwise enable the SMF 108 to identify the UE and/or the communication session to be intercepted. In some cases, the interception request 202 may specify one or more limitations. For instance, the interception request 202 may specify at least one of a time, a location of the UE, a type of services, or the like, characterizing the session and/or data to be intercepted.

In some cases, the interception request 202 may include authentication information. Based on the authentication information, the SMF 108 may identify that the interception server 116 and/or the interception request 202 are authorized to request interception. For example, the interception request 202 may identify at least one password corresponding to an entity authorized to perform interception.

In response to receiving the interception request 202, the SMF 108 may transmit a forwarding instruction 204 to the UPF 110 and may transmit signaling (e.g., control plane) data 206 to the interception server 116. The forwarding instruction 204 may instruct the UPF 110 to forward user plane data specified by the interception request 202 to the interception server 116. In some cases, the forwarding instruction 204 may indicate how the user plane data should be forwarded to the interception server 116. For instance, the forwarding instruction 204 may include a message instructing the UPF 110 how the user plane data should be split up into multiple data streams. In some cases, the forwarding instruction 204 may specify an identifier of the interception server 116, which may enable the UPF 110 to establish a connection with the interception server 116 that does not include the SMF 108. Accordingly, the UPF 110 may be enabled to communicate with the interception server 116 directly.

The signaling data 206 may include Non Access Stratum (NAS) data, for example. The signaling data 206 may be transmitted to the interception server 116 in the form of at least one data stream. For instance, the signaling data 206 may be transmitted as a single Transfer Control Protocol (TCP) stream from the SMF 108 to the interception server 116.

In response to receiving the forwarding instruction 204, the UPF 110 may transmit user plane data 208 to the interception server 116 in multiple data streams. For instance, the UPF 110 may transmit the user plane data 208 to the interception server 116 in multiple TCP streams. Accordingly, even when a throughput rate of the user plane data being transmitted through the UPF 110 exceeds a maximum transfer rate of one of the multiple data streams, the UPF 110 may nevertheless be able to transfer the user plane data 208 in real time via the multiple data streams.

In addition, the SMF 108 may transmit a key 210 to the interception server 116. The key 210 may specify how the interception server 116 can restore the user plane data 208 from the multiple streams transmitted by the UPF 110. In some cases, the UPF 110 transmits the user plane data 208 in the multiple streams according to a predetermined scheme, such that the key 210 may be prestored by the SMF 108. According to some examples, the SMF 108 may instruct the UPF 110 how to split the user plane data 208 into the multiple streams in the forwarding instruction 204 and can generate the key 210 based on the forwarding instruction 204. In certain examples, the UPF 110 can generate the key 210 according to how the UPF 110 splits up the user plane data 208 in the multiple streams and transmits the key 210 to the SMF 108, so that the SMF 108 can forward the key 210 to the interception server 116.

Accordingly, as a result of the signaling 200, the interception server 116 may have the requested signaling data 206 and may also have a key that enables the interception server 116 to restore the user plane data 208 from the multiple data streams. In some cases, the interception server 116 can store the signaling data 206 and/or the user plane data 208 for further processing and/or analysis.

Figure 2B:
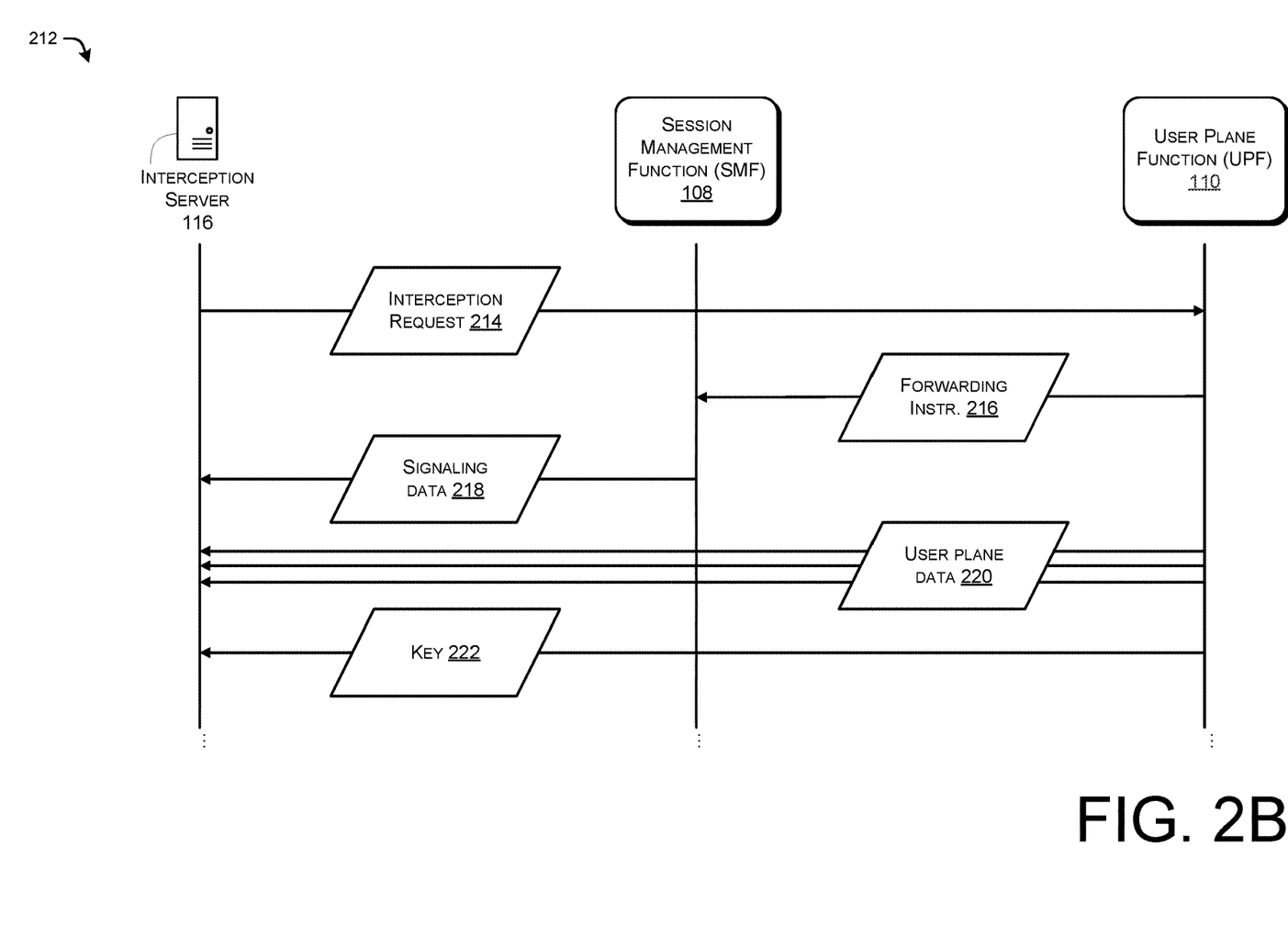

FIG. 2B illustrates example signaling 212 for performing interception of high-throughput data. In various implementations, the signaling 212 can occur between the interception server 116, the Session Management Function (SMF) 108, and the User Plane Function (UPF) 110 described above with reference to FIG. 1.

In particular implementations, the signaling 212 can occur after a communication session has been set up between a User Equipment (UE) (e.g., the UE 102 described above with reference to FIG. 1) and a Data Network (DN) (e.g., the DN 114 described above with reference to FIG. 1). For example, the UE may be attached to a Radio Access Network (RAN), the SMF 108 may have selected the UPF 110, and/or the UPF 110 may be transferring uplink and downlink user plane data between the UE 102 and the DN.

The interception server 116 may transmit an interception request 214 to the UPF 110. The interception request 214 may identify the UE, the communication session, or otherwise enable the UPF 110 to identify the UE and/or the communication session to be intercepted. In some cases, the interception request 214 may specify one or more limitations. For instance, the interception request 214 may specify at least one of a time, a location of the UE, a type of services, or the like, characterizing the session and/or data to be intercepted.

In some cases, the interception request 214 may include authentication information. Based on the authentication information, the UPF 110 may identify that the interception server 116 and/or the interception request 214 are authorized to request interception. For example, the interception request 214 may identify at least one password corresponding to an entity authorized to perform interception.

In response to receiving the interception request 214, the UPF 110 may transmit a forwarding instruction 216 to the SMF 108. The SMF 108, in turn, may transmit signaling data 218 to the interception server 116. The forwarding instruction 216 may instruct the SMF 108 to forward control plane data specified by the interception request 214 to the interception server 116. In some cases, the forwarding instruction 216 may indicate how the control data should be forwarded to the interception server 116. For instance, the forwarding instruction 216 may include an identifier of the interception server 116, which may enable the SMF 108 to establish a connection with the interception server 116 that does not include the UPF 110. Accordingly, the SMF 108 may be enabled to communicate with the interception server 116 directly.

The signaling data 218 may include Non Access Stratum (NAS) data, for example. The signaling data 218 may be transmitted to the interception server 116 in the form of at least one data stream. For instance, the signaling data 218 may be transmitted as a single Transfer Control Protocol (TCP) stream from the SMF 108 to the interception server 116.

The UPF 110 may transmit user plane data 220 to the interception server 116 in multiple data streams. For instance, the UPF 110 may transmit the user plane data 220 to the interception server 116 in multiple TCP streams. Accordingly, even when a throughput rate of the user plane data being transmitted through the UPF 110 exceeds a maximum transfer rate of one of the multiple data streams, the UPF 110 may nevertheless be able to transfer the user plane data 220 in real time via the multiple data streams.

In addition, the UPF 110 may transmit a key 210 to the interception server 116. The key 210 may specify how the interception server 116 can restore the user plane data 220 from the multiple streams transmitted by the UPF 110. In some cases, the UPF 110 transmits the user plane data 220 in the multiple streams according to a predetermined scheme, such that the key 210 may be prestored by the UPF 110. In certain examples, the UPF 110 can generate the key 210 according to how the UPF 110 splits up the user plane data 220 in the multiple streams and can forward the key 210 to the interception server 116.

Accordingly, as a result of the signaling 212, the interception server 116 may have the requested signaling data 218 and may also have a key that enables the interception server 116 to restore the user plane data 220 from the multiple data streams. In some cases, the interception server 116 can store the signaling data 218 and/or the user plane data 220 for further processing and/or analysis.

Figure 3:
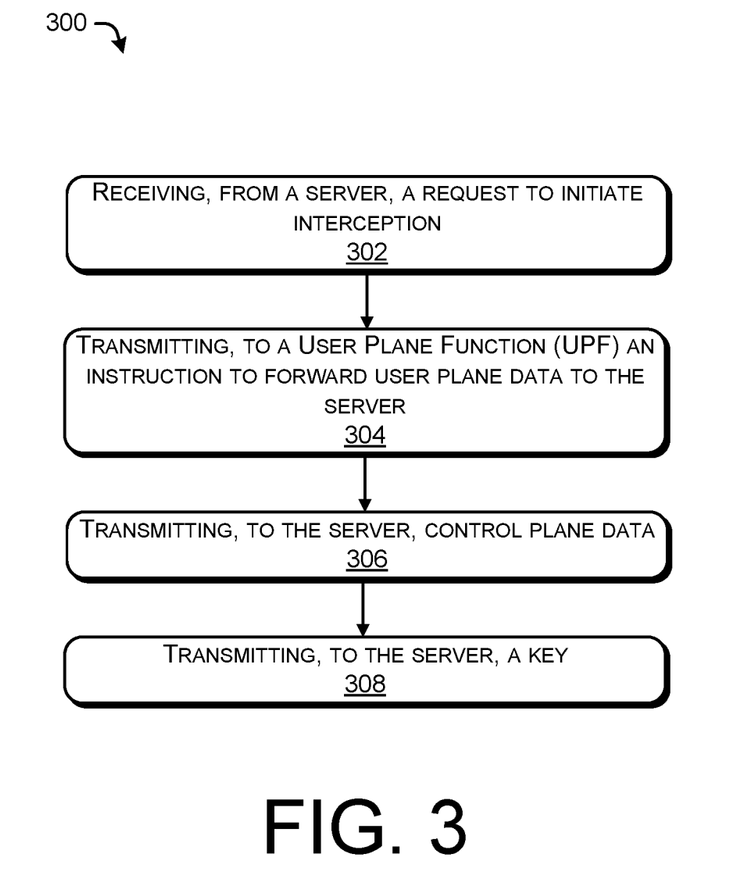
FIG. 3 illustrates an example process for facilitating the interception of control plane data and the interception of user plane data.
Figure 4:
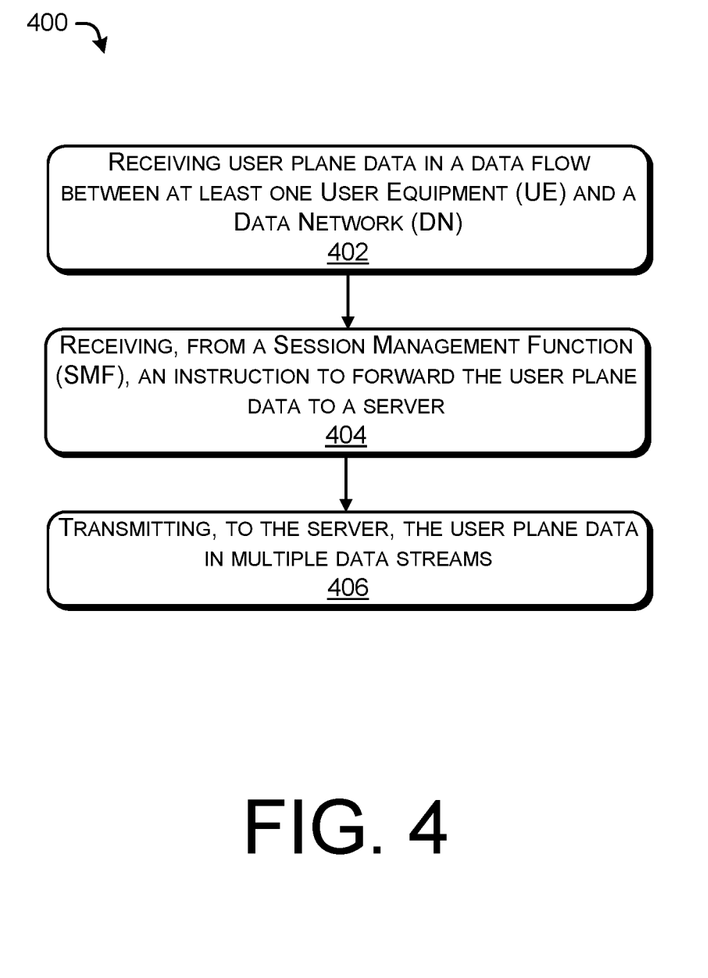
FIG. 4 illustrates an example process for facilitating the interception of user plane data.

FIGS. 3 and 4 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process 300 for facilitating the interception of control plane data and the interception of user plane data. In particular implementations, the process 300 can be performed by a Session Management Function (SMF), such as the SMF 108 described above with reference to FIGS. 1 and 2A, or by a User Plane Function (UPF), such as the UPF 110 described above with reference to FIGS. 1 and 2B.

At 302, a request to initiate interception is received from a server. The request may identify at least one of a terminating node (e.g., a User Equipment (UE)) in a communication session to be intercepted, the communication session itself, or may provide enough information such that the terminating node and/or the communication session can be identified. For instance, the request may specify an Internet Protocol (IP) address of a UE whose data traffic is to be intercepted, an account associated with a user of the UE, an identifier of the communication session, an identifier of a tunnel over which user plane data in the communication session is transmitted, or the like.

In some cases, the request can further specify at least one additional feature of the data to be intercepted, such as a time interval at which the data to be intercepted is transmitted or received by a terminating node, an amount of the data to be intercepted, a type of services corresponding to the data to be intercepted, or the like. For example, the request can specify that any data corresponding to voice services transmitted from a particular subscriber account between the hours of 9 PM and 11 PM on a particular data should be intercepted.

In certain implementations, the request may be part of an authentication processes by which the server is identified as authorized to intercept data traffic. In some cases, the entity performing process 300 and the server may exchange messages, including the request, as part of a handshake procedure. In particular examples, the request may specify a password or code that indicates the server is authorized to perform interception.

At 304, an instruction to forward user plane data to the server is transmitted to a User Plane Function (UPF). The instruction may identify user plane data to be intercepted by the server, as specified in the request from the server. For instance, if the request identifies that data associated with a communication session corresponding to a particular user account is to be intercepted, the instruction may cause the UPF to forward user plane data exchanged by a UE corresponding to the particular user account to the server. The user plane data may include at least one of image data, video data, voice data, web browsing data, audio data, or the like.

In some cases, the instruction may further specify that the user plane data should be forwarded to the server in multiple data streams. In certain implementations, the instruction may specify, to the UPF, how the user plane data should be split into the multiple data streams. In other cases, the UPF may be preconfigured to forward the user plane data in multiple data streams. In various cases, the instruction may cause the UPF to transmit the user plane data to the server in multiple data streams.

At 306, control plane data is transmitted to the server. The control plane data may correspond to the user plane data to be intercepted by the server, as specified in the request from the server. In some cases, the control plane data includes Non-Access Stratum (NAS) data corresponding to the intercepted communication session.

At 308, a key is transmitted to the server. The key may indicate how to restore the user plane data from the multiple data streams. The server may use the key to restore the user plane data from the multiple data streams, in various examples. In some cases, the key may be forwarded from the UPF that generated the multiple data streams. In certain cases, the instruction transmitted at 304 may have specified how the user plane data should be split up into the multiple data streams, and the key is generated and/or retained based on the instruction.

As a result of the process 300, the server may specify and intercept data traffic. In particular, the server may receive both the user plane data and control plane data corresponding to the specified data traffic in real time, as the data traffic is being transferred through a high-throughput delivery network, such as a 5G network. By forwarding the user plane data in real time, the UPF may provide all of the requested user plane data to the server regardless of a buffer capacity of the UPF. Furthermore, the key may enable the server to restore the user plane data from multiple data streams transmitted by the UPF.

FIG. 4 illustrates an example process 400 for facilitating the interception of user plane data. In particular implementations, the process 400 can be performed by a User Plane Function (UPF), such as the UPF 112 described above with reference to FIGS. 1 and 2A.

At 402, user plane data in a data flow between at least one User Equipment (UE) and a Data Network (DN) is received. In particular implementations, the user plane data is received at a relatively high throughput rate. The user plane data may correspond to at least one type of services, such as image data, video data, voice data, web browsing data, audio data, or the like. In some cases, the user plane data is received at 402 in response to receiving a message that the UPF has been selected to facilitate delivery of the user plane data between the UE and the DN.

At 404, an instruction to forward the user plane data to a server is received from a Session Management Function (SMF). The instruction may specify various features identifying the user plane data, such as an identifier of the UE, an identifier of the data flow, or the like. In addition, the instruction may specify at least one a time interval at which the user plane data is to be intercepted, a type of services to be intercepted, or the like.

At 406, the user plane data is transmitted to the server in multiple data streams. According to particular implementations, a maximum data transfer rate of each one of the multiple data streams may be lower than the throughput rate of the user plane data. However, the collective data transfer rate of the multiple data streams can accommodate the throughput rate of the user plane data. Accordingly, the user plane data can be transmitted to the server as the user plane data is received, without significant delays. The multiple data streams can include multiple Transfer Control Protocol (TCP) streams, in some cases.

In certain implementations, the SMF may instruct how the user plane data should be split into the multiple data streams. In some examples, a key may be transmitted to the SMF. The key may indicate how the user plane data can be restored from the multiple data streams. In some cases, the SMF may forward the key to the server, so that the server can restore the user plane data from the multiple data streams.

As a result of the process 400, the server may receive the user plane data in real time, as the data traffic is being transferred through at least one delivery network. In particular, the server may receive the user plane data as the data traffic is being transferred through a high-throughput delivery network, such as a 5G network. By forwarding the user plane data in real time, all of the requested user plane data may be forwarded to the server regardless of a local buffer capacity. Furthermore, the key may enable the server to restore the user plane data from multiple data streams.

Figure 5:
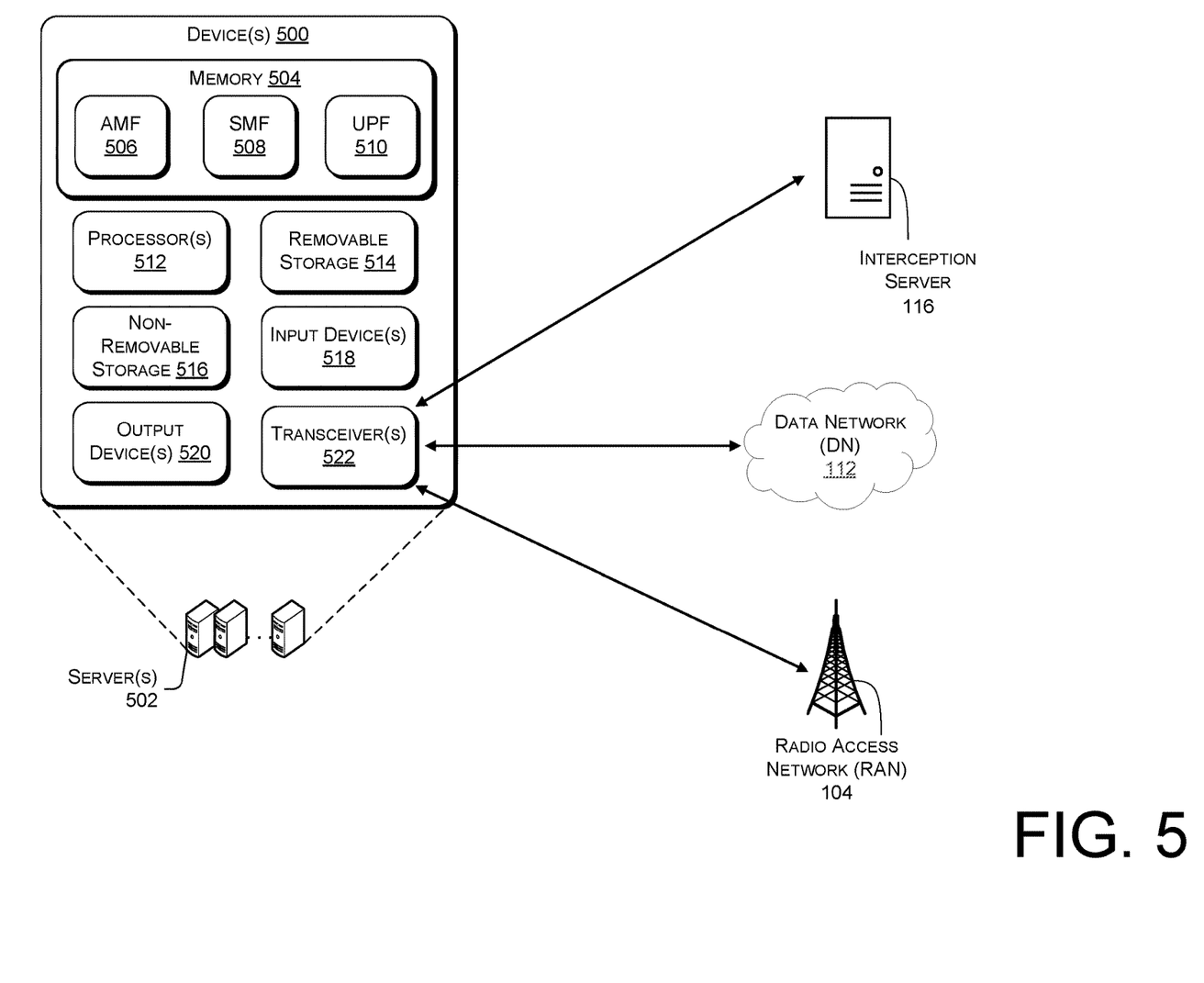
FIG. 5 illustrates example device(s) configured to enable and/or perform interception of high-throughput data traffic.

FIG. 5 illustrates at least one example device 500 configured to enable and/or perform the interception of high-throughput data traffic. In some embodiments, some or all of the functionality discussed in connection with FIGS. 1-4 can be implemented in the device(s) 500. Further, the device(s) 500 can be implemented as one or more server computers 502, a network element on a dedicated hardware, as a software instance running on a dedicated hardware, or as a virtualized function instantiated on an appropriate platform, such as a cloud infrastructure, and the like. It is to be understood in the context of this disclosure that the device(s) 500 can be implemented as a single device or as a plurality of devices with components and data distributed among them.

As illustrated, the device(s) 500 comprise a memory 504. In various embodiments, the memory 504 is volatile (including a component such as Random Access Memory (RAM)), non-volatile (including a component such as Read Only Memory (ROM), flash memory, etc.) or some combination of the two.

The memory 504 may include various components, such as an Application Management Function (AMF) 506, a Session Management Function (SMF) 508, and at least one User Plane Function (UPF) 510. Any of the AMF 506, the SMF 508, and the UPF 510 can comprise methods, threads, processes, applications, or any other sort of executable instructions. The AMF 506, the SMF 508, the UPF 510, and various other elements stored in the memory 504 can also include files and databases.

The AMF 506 may include a network function having functionality to provide User Equipment (UE)-based authentication, authorization, mobility management, etc., to various UEs. In some instances, the AMF can include functionality to terminate a Radio Access Network (RAN) control plane interface between a UE and other functions of the network. In some instances, the AMF can include functionality to perform registration management of the UE in the network, connection management, reachability management, mobility management, access authentication, access authorization, security anchor functionality (e.g., receiving and/or transmitting security keys during registration/authorization), and the like.

The SMF 508 may include instructions to perform various functions, such as forwarding control plane data to the interception server 116, instructing the UPF 510 to forward user plane data to the interception server 116, instructing the UPF 510 how to split the user plane data into multiple data streams, and forwarding a key to the interception server 116. The SMF 508 may cause the performance of various functionality in response to receiving a request for interception from the interception server 116.

The UPF 510 may include instructions to perform various functions, such as forwarding user plane data between the RAN 104 and the Data Network (DN) 112, forwarding the user plane data to the interception server 116 in multiple data streams, and providing the key to the SMF 108 based on how the user plane data is divided into the multiple data streams. The UPF 510 may cause the performance of various functionality in response to receiving to receiving a forwarding instruction from the SMF 108.

The memory 504 may include various instructions (e.g., instructions in the AMF 506, the SMF 508, and/or the UPF 510), which can be executed by at least one processor 512 to perform operations. In some embodiments, the processor(s) 512 includes a Central Processing Unit (CPU), a Graphics Processing Unit (GPU), or both CPU and GPU, or other processing unit or component known in the art.

The device(s) 500 can also include additional data storage devices (removable and/or non-removable) such as, for example, magnetic disks, optical disks, or tape. Such additional storage is illustrated in FIG. 5 by removable storage 514 and non-removable storage 516. Tangible computer-readable media can include volatile and nonvolatile, removable and non-removable media implemented in any method or technology for storage of information, such as computer readable instructions, data structures, program modules, or other data. The memory 504, removable storage 514, and non-removable storage 516 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device(s) 500. Any such tangible computer-readable media can be part of the device(s) 500.

The device(s) 500 also can include input device(s) 518, such as a keypad, a cursor control, a touch-sensitive display, voice input device, etc., and output device(s) 520 such as a display, speakers, printers, etc. These devices are well known in the art and need not be discussed at length here. In particular implementations, a user can provide input to the device(s) 500 via a user interface associated with the input device(s) 518 and/or the output device(s) 520.

As illustrated in FIG. 5, the device(s) 500 can also include one or more wired or wireless transceiver(s) 522. For example, the transceiver(s) 522 can include a Network Interface Card (NIC), a network adapter, a Local Area Network (LAN) adapter, or a physical, virtual, or logical address to connect to the various base stations or networks contemplated herein, for example, or the various user devices and servers. To increase throughput when exchanging wireless data, the transceiver(s) 522 can utilize Multiple-Input/Multiple-Output (MIMO) technology. The transceiver(s) 522 can include any sort of wireless transceivers capable of engaging in wireless, Radio Frequency (RF) communication. The transceiver(s) 522 can also include other wireless modems, such as a modem for engaging in Wi-Fi, WiMAX, Bluetooth, or infrared communication.

In some implementations, the transceiver(s) 522 can be used to communicate between various functions, components, modules, or the like, that are comprised in the device(s) 500. For instance, the transceiver(s) 522 can be used to transmit data between the AMF 506 and the SMF 508, between the SMF 508 and the UPF 510, or the like.

Example Clauses

The following example clauses relate to various implementations of the present disclosure:

A. A method performed by a Session Management Function (SMF), the method including: selecting a User Plane Function (UPF) to transfer user plane data in a data flow between a User Equipment (UE) and a Data Network (DN); receiving, from an interception server, a request to initiate interception; in response to receiving the request: causing the UPF to forward the user plane data to the interception server via multiple first Transfer Control Protocol (TCP) streams by transmitting, to the UPF, an instruction to forward the user plane data to the interception server; transmitting, to the interception server, control plane data associated with the data flow via a second TCP stream; and transmitting, to the interception server, a key indicating how the user plane data can be reassembled from the multiple first TCP streams.

B. The method of clause A, wherein the user plane data includes at least one of image data, video data, voice data, web browsing data, or audio data.

C. The method of clause A or B, wherein the control plane data includes Non-Access Stratum (NAS) data associated with the data flow.

D. The method of any one of clauses A to C, further comprising: transmitting, to the UPF, a message instructing how the user plane data should be split between the multiple first TCP streams.

E. The method of any one of clauses A to D, further comprising: receiving, from the UPF, the key.

F. The method of any one of clauses A to E, wherein a rate at which the user plane data is received at the UPF exceeds a maximum data transfer rate of one of the multiple first TCP streams.

G. The method of claim any one of clauses A to F, wherein the request to initiate interception identifies at least one of the UE or a device communicating with the UE.

H. A method, comprising: receiving, from a server, a request to initiate interception; and in response to receiving the request to initiate interception: causing a User Plane Function (UPF) to forward user plane data associated with a data flow to the server via multiple data streams by transmitting, to the UPF, an instruction to forward the user plane data to the server; and transmitting, to the server, control plane data associated with the data flow.

I. The method of clause H, further including: transmitting, to the server, a key indicating how the user plane data can be reassembled from the multiple data streams transmitted from the UPF to the server.

J. The method of clause H or I, further including: receiving, from the UPF, the key.

K. The method of any one of clauses H to J, wherein the request to initiate interception identifies at least one of the data flow or a User Equipment (UE) associated with the data flow.

L. The method of any one of clauses H to K, wherein the user plane data includes at least one of image data, video data, voice data, web browsing data, or audio data.

M. The method of any one of clauses H to L, wherein the control plane data includes Non-Access Stratum (NAS) data associated with the data flow.

N. The method of any one of clauses H to M, wherein the control plane data is transmitted via a Transfer Control Protocol (TCP) stream.

O. The method of any one of clauses H to M, further including: transmitting, to the UPF, a message instructing how the user plane data should be split between the multiple streams.

P. A system, including: at least one processor; and memory storing instructions that, when executed by the at least one processor, cause the at least one processor to perform operations including the method of any one of clauses H to M.

Q. A User Plane Function (UPF), including: at least one processor; and memory storing instructions that, when executed by the at least one processor, cause the at least one processor to perform operations including: receiving user plane data in a data flow between at least one User Equipment (UE) and a Data Network (DN); receiving, from a Session Management Function (SMF), an instruction to forward the user plane data to a server; and in response to receiving the instruction, transmitting, to the server, the user plane data in multiple Transfer Control Protocol (TCP) streams.

R. The UPF of clause Q, wherein a rate at which the user plane data is received at the UPF exceeds a maximum data transfer rate of one of the multiple TCP streams.

S. The UPF of clause Q or R, wherein the operations further include: transmitting, to the SMF, a key instructing how the user plane data can be reassembled from the multiple TCP streams.

T. The UPF of any one of clauses Q to S, wherein the user plane data includes at least one of image data, video data, voice data, web browsing data, or audio data.

U. The UPF of any one of clauses Q to T, wherein the operations further include: receiving, from the SMF, a message indicating a selection of the UPF by the SMF, wherein receiving the user plane data in the data flow is in response to receiving the message.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by a Session Management Function (SMF), the method comprising:
    selecting a User Plane Function (UPF) to transfer user plane data in a data flow between a User Equipment (UE) and a Data Network (DN);
    receiving, from an interception server, a request to initiate interception;
    in response to receiving the request:
        causing the UPF to forward the user plane data to the interception server via multiple first Transfer Control Protocol (TCP) streams by transmitting, to the UPF, an instruction to forward the user plane data to the interception server;
        transmitting, to the interception server, control plane data associated with the data flow via a second TCP stream; and transmitting, to the interception server, a key indicating how the user plane data can be reassembled from the multiple first TCP streams.

2. The method of claim 1, wherein the user plane data comprises at least one of image data, video data, voice data, web browsing data, or audio data.

3. The method of claim 1, wherein the control plane data comprises Non-Access Stratum (NAS) data associated with the data flow.

4. The method of claim 1, further comprising:
transmitting, to the UPF, a message instructing how the user plane data should be split between the multiple first TCP streams.

5. The method of claim 1, further comprising:
receiving, from the UPF, the key.

6. The method of claim 1, wherein a rate at which the user plane data is received at the UPF exceeds a maximum data transfer rate of one of the multiple first TCP streams.

7. The method of claim 1, wherein the request to initiate interception identifies at least one of the UE or a device communicating with the UE.

8. A system, comprising:
at least one processor; and
memory storing instructions that, when executed by the at least one processor, cause the at least one processor to perform operations comprising:
receiving, from a server, a request to initiate interception; and
in response to receiving the request to initiate interception:
causing a User Plane Function (UPF) to forward user plane data associated with a data flow to the server via multiple data streams by transmitting, to the UPF, an instruction to forward the user plane data to the server; and
transmitting, to the server, control plane data associated with the data flow; and
transmitting, to the server, a key instructing how the user plane data can be reassembled from the multiple data streams.

9. The system of claim 8, wherein the operations further comprise:
receiving, from the UPF, the key.

10. The system of claim 8, wherein the request to initiate interception identifies at least one of the data flow or a User Equipment (UE) associated with the data flow.

11. The system of claim 8, wherein the user plane data comprises at least one of image data, video data, voice data, web browsing data, or audio data.

12. The system of claim 8, wherein the control plane data comprises Non-Access Stratum (NAS) data associated with the data flow.

13. The system of claim 8, wherein the control plane data is transmitted via a Transfer Control Protocol (TCP) stream.

14. The system of claim 8, wherein the operations further comprise:
transmitting, to the UPF, a message instructing how the user plane data should be split between the multiple streams.

* * * * *